Oct. 31, 1944. L. E. BAKER 2,361,676
DEVICE FOR IMPELLING AND PROPELLING FLUIDS OR GASES OR THE LIKE
Filed May 15, 1939 3 Sheets-Sheet 1
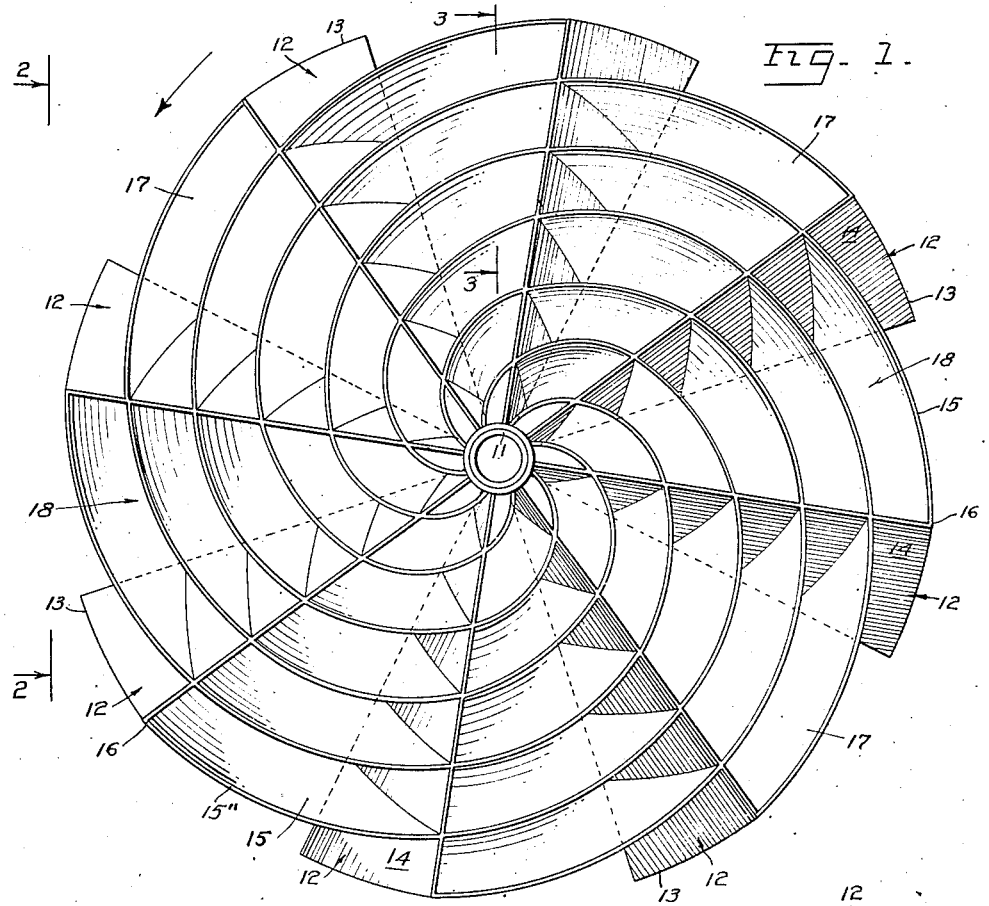
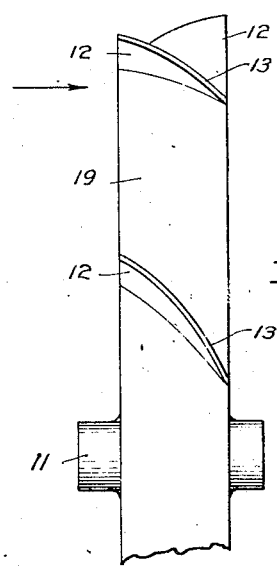
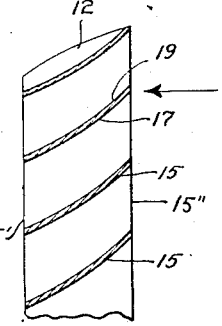
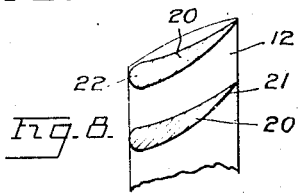
INVENTOR.
LIN E. BAKER
BY George B. White
ATTORNEY.

Oct. 31, 1944.  L. E. BAKER  2,361,676
DEVICE FOR IMPELLING AND PROPELLING FLUIDS OR GASES OR THE LIKE
Filed May 15, 1939  3 Sheets-Sheet 2
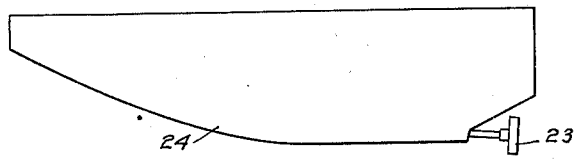
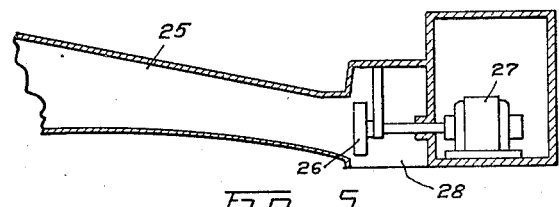
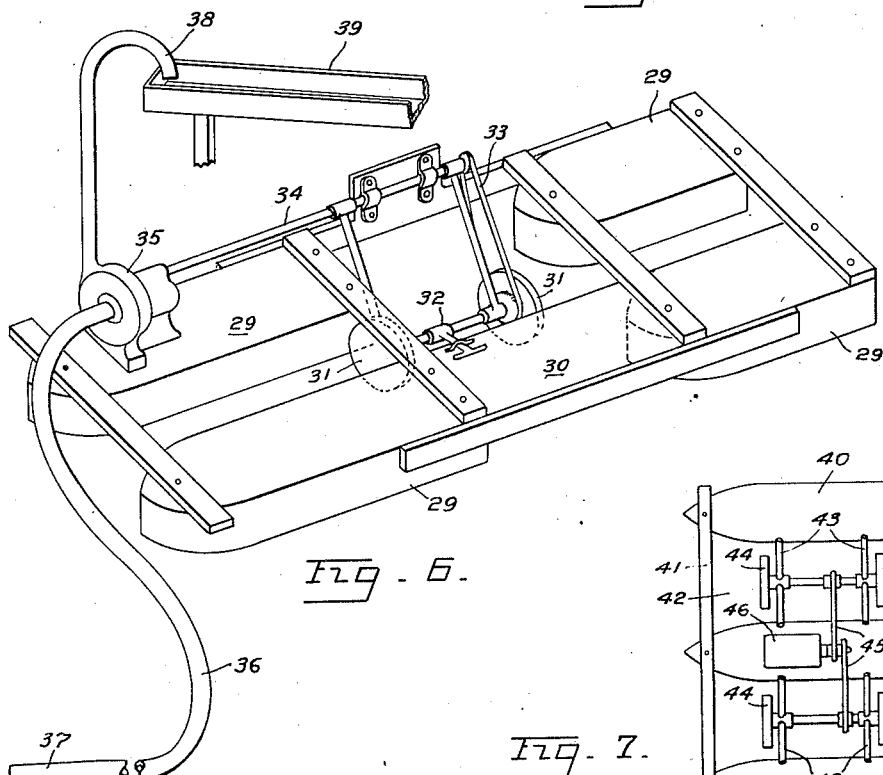
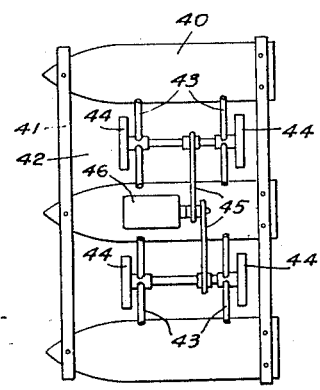
INVENTOR.
LIN E. BAKER
BY George B. White
ATTORNEY.

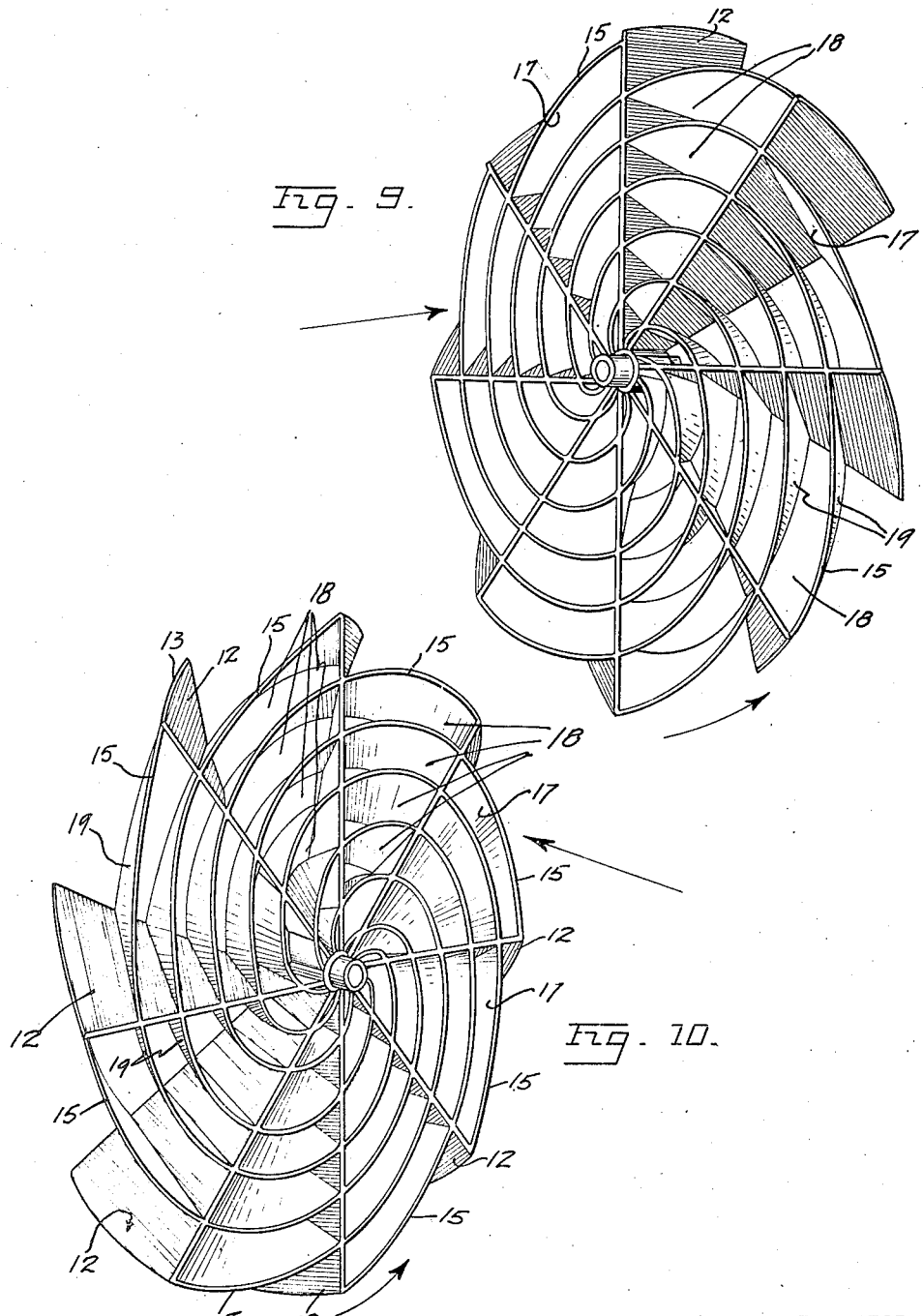

Patented Oct. 31, 1944

2,361,676

UNITED STATES PATENT OFFICE 2,361,676

DEVICE FOR IMPELLING AND PROPELLING FLUID OR GAS OR THE LIKE

Lin E. Baker, San Francisco, Calif.

Application May 15, 1939, Serial No. 273,697

10 Claims. (Cl. 170—170)

This invention relates to a method and device for propelling and impelling fluid or gas, and broadly to the interchange of kinetic energy and to a rotating wheel.

The object of this invention is the conversion of kinetic energy, or stored capacity for performing work by a moving body, into force for performing said work. Particularly the force of a moving body of fluid or gas can be converted into a rotary movement of a wheel, or the energy of a rotating wheel may be converted into a relative movement of the fluid, gas, or air. In some instances these forces are combined together and the energy of the moving fluid or gas and the energy of the rotating wheel are directed to perform work together. The method and device herein described is adapted for use as a water wheel, or propeller, or as an air propeller for aircraft, or in blowers for air conditioning, and the like.

Particularly the method consists in converting or directing the energy of a body of fluid or gas relatively to a rotating body in such a manner that the entire available energy is efficiently utilized.

A feature of this method is the direction of the relative fluid or gas flow simultaneously on an axially flaring but circumferentially centripetal path. The application of forces between the fluid or gas and the wheel is accomplished through radial twisted blades and circumferentially spiral vanes which intersect said blades.

An object of the invention is to provide a propeller wheel which is highly efficient, requiring smaller diameter, less width, thinner blades and smaller weight than normal propellers of similar power, the wheel including a system of intersecting vanes and blades to coact with a body of fluid or gas or air at an optimum angle for fully utilizing all the available energy.

In this application I show and describe a preferred embodiment of my invention but it is to be understood that this embodiment is by way of illustration only and that I do not wish to be limited to this illustrative form because my invention may be embodied in other forms within the scope of my invention.

The invention is clearly illustrated in the accompanying drawings, wherein

Fig. 1 is a rear plan view of the propeller wheel of my invention.

Fig. 2 is a fragmental end view, viewing Fig. 1 from the direction of the arrows 2—2 of Fig. 1.

Fig. 3 is a fragmental sectional view of a modified form of the wheel wherein the spiral vanes are dished or of curved cross section.

Fig. 4 is a diagrammatic view showing the use of my propeller on a motor boat.

Fig. 5 is a fragmental view partly in section of the assembly and application of my wheel in a pipe line or the like.

Fig. 6 is a diagrammatic view of the use of my wheel on a gold dredge or the like on a body of water.

Fig. 7 is a plan view of an arrangement of a floating power plant utilizing my wheels.

Fig. 8 is a fragmental sectional view of a tapering vane structure of my wheel.

Fig. 9 is a perspective view of the wheel, viewing from the intake side, the curved arrow indicating direction of rotation, and the straight arrow indicating direction of passage through the wheel, and Fig. 10 is another perspective view of the wheel, viewing it from the intake side, the curved arrow indicating direction of rotation, and the straight arrow indicating direction of passage through the wheel.

In general my method includes the steps of applying the relative forces of a body of fluid, air or gas and of a rotating mass at such angle and area as to fully utilize the energy created by the relative movement of said bodies until said energy is spent as completely as possible. For instance a moving body of water, air or gas is guided through a rotating wheel by intersecting elements, one set of said elements being a circumferentially centripetal spiral vanes and the other set consisting of radial twisted blades. The pitch and curvature of said intersecting elements being such that the energy of said relative movement is spent equally on the intersecting surfaces of said elements. In other words the force of the relative movement of a body of water, air or gas and of a rotating mass is simultaneously applied on inclined surfaces of substantially equal pitch, which form the walls of transverse passages one set of said surfaces is substantially radial, and the other set is circumferentially spiral from the periphery of the wheel toward the center of rotation. The pitch of the respective surfaces, as herein referred to, is the distance each side would advance in one complete revolution in a solid substance. In other words, the so-called bites of the respective surfaces around each passage are equal. Particularly the water, air or gas is directed through a plurality of series of transverse passages arranged circumferentially to form a wheel. Each passage is defined by four curved sides, each side forming an inclined surface substantially of the same pitch with respect to the same center of rotation. The series of passages are in parallel spiral rows extending from the periphery of the rotating wheel toward the center of rotation. The transverse passages are substantially axial through the rotating body or wheel converging toward the discharge side. The size of the passages in the series gradually diminishes toward the center of the wheel in accordance with the convergence of the radial surfaces. An added step of the method is the increase of the velocity of the fluid or air flow through said passages toward the discharge side of the rotating body so as to create a turning moment by the reaction force created by said discharge.

My propeller or impeller wheel includes a central hub or boss 11 adapted to be secured to a shaft. To this hub 11 are secured a plurality of blades 12, each of which is shaped and formed like the others and set angularly equidistant from one another with their center lines at right angles, or nearly so, with the axis of the hub 11. The curved tips 13 of the blades 11 are substantially on the same radius so as to lie in the circumference of the wheel.

To the central hub 11 are secured the central ends of transverse spiral vanes 15. The outer end 16 of each vane 15 is affixed to the tip 13 of one of the blades 12 and the vane 15 extends circumferentially and spirally toward the hub 11. Each vane 15 intersects a number of blades 12 at points successively closer to the hub 11. Each vane 15 is on a transverse incline so that the surface 17 thereof converges toward the discharge side and toward the center of the wheel. The trailing edge 15' of each vane 15 is closer to the center of the wheel than its leading edge 15". The wheel rotates in a contra-clockwise direction viewing Fig. 1 both when used as a propeller and also when used as a water wheel for power generation.

The water or air is directed between the vanes 12 through transverse spaces 18. Each space 18 is bounded by four sides, namely, by a section of a face 14 of one blade 12 and a section of the back surface of the next adjacent blade 12 at the opposite sides of the space 18, and at the top and bottom respectively by the underface and top face of sections of adjacent spiral vanes 15 between said adjacent blades 12. The spaces 18 are formed in a plurality of parallel spiral series gradually diminishing in sizes toward the center of the wheel in accordance with the convergence of the blades 12 toward the center of rotation of the wheel. Each vane 15 may be also curved transversely as shown in the modified form in Fig. 3 so that the top or outer surface 19 of each vane 15 is concave and its lower or inner surface is convex. The vanes 15 are substantially parallel with each other except for a slight convergence where the vanes 15 curve in to the hub 11.

In the modified form of my device shown in Fig. 8 the vanes 20 are streamlined so that the leading edge 21 of each vane 20 is thinner than the trailing following edge 22. This results in a gradually diminishing space between the vanes 20 and the setting up of additional turning moment by the reaction of the water or air discharging through such reduced orifice.

The pitch of the blades 12 and the incline of the spiral vanes 15 are so proportioned that at a given angular turn of the wheel the working area of each spiral vane 15 and the working area of each blade 12 have the same pitch, as heretofore defined, and are preferably equal. In other words the wheel comprises a plurality of helically twisted radial blades 12 on a hub 11 or the like and interconnecting arcuate vanes 15 between the adjacent blades 12 arranged on a spiral incline from the outer periphery of the wheel toward the hub 11 so that the intermediate vane sections complement each other into centripetal spirals. Or vice versa the wheel may be described as a plurality of spiral vanes 15 extended from the hub 11 and radial braces extended from the outside end of each vane 15 toward the center substantially at right angles to the axis of the hub 11 and being twisted toward the direction of rotation and being diminished in width toward the center. The blades 12 and the vanes 15 are mutual braces and coact in directing water, air or gas most efficiently and also give added rigidity to the wheel or propeller thereby permitting the use of thinner, lighter material, and propellers of smaller diameter and width for a given power, than those of propellers heretofore in use. The blades 12 and the vanes 15 may be welded together or the propeller may be case into the shape described.

The wheel as shown at 23 on the motor boat 24 in Fig. 4 operates with great power and minimum disturbance because of high efficiency and the directing of the water at the angles afore described.

In the power generator assembly shown in Fig. 5, the usual pipe line 25 conducts the water at high velocity to the waterwheel 26 constructed in accordance with my invention as herein described, and the wheel 26 is connected in a suitable manner to the generator 27. The outlet for the spent water is below the wheel as shown at 28.

In Fig. 6, I show the application of my waterwheel to a gold dredging device. This includes a float made of pontoons 29 on which is mounted a superstructure or frame 30. A pair of aligned water wheels 31 of my construction are supported on brackets 32 so as to extend below the frame 30 and below the pontoons 29. As a dredge floats in the stream the water stream or flow rotates the wheels 31 which rotation is transmitted through suitable transmission such as a sprocket and wheel transmission 33 to a drive shaft 34 on the superstructure 30 which suitably drives a centrifugal pump 35. The intake of the pump 35 has on it a flexible hose 36 with a suitable suction nozzle 37 at its end. This hose 36 is long enough to be dragged on the bottom of the stream or body of water so as to suck up the fine goldbearing sand from the bottom. This sand is then discharged through an outlet 38 of the pump 35 into a suitable separator or the like table 39 suitably supported on the superstructure 30. This construction illustrates an application of my wheel to a device which can be used in places remote from power supply because the device through my wheels generates its own power and operates its pump as it moves along the stream or river.

In the form shown in Fig. 7 a floating power plant is illustrated. On spaced pontoons 40 is supported a superstructure 41 to hold them together. In the spaces 42 between the pontoons 40 on suitable brackets 43 are journalled aligned pairs of wheels 44 of my construction as heretofore described. Each pair of wheels 44 is in the stream that flows along the pontoons 40. The pairs of wheels 44 are connected through suitable transmissions 45 to a generator 46 mounted on the central pontoon 40. The power may be transmitted from this generator wherever it may be needed.

There are numerous applications of great variety for a wheel of the construction herein described. There are also various uses for my method of utilizing the full kinetic energy of fluids or air relatively to rotating bodies. The method and device may be applied for instance to propel ships in water, to generate power, to impel fluid or air, to circulate air in blowers, or to propel aircrafts in air.

The method and device deliver comparatively large volumes of air or water, and generate comparatively greater propelling force for a given diameter efficiently, reducing the weight, thickness, width, and size, as compared with propellers and impellers heretofore used.

My theory of the operation of the wheel is that the fluid impinges on the intersecting surfaces defining each passage so that the centripetal force thus exerted partly or wholly counteracts the centrifugal force created by the rotation of the wheel and therefore my structure permits the use of comparatively lighter wheels. The fluid is guided by said intersecting surfaces so that the screw action of the radial blades and the action of the spiral vanes augment each other thereby increasing the volume of fluid motion through the wheel and enhance the exchange of kinetic energy. The actual operation of this wheel shows a superiority of the principle involved over propellers and impellers heretofore used whatever the theory of the operation may be. Therefore I do not wish to confine myself to any particular theory of operation.

Having thus described my invention, what I now claim and desire to secure by Letters Patent is:

1. A propeller and impeller wheel comprising a hub, a plurality of substantially radial propelling elements extended from the hub, and plurality of transverse propelling members formed between said radial elements so as to spiral toward the hub and intersect said radial propelling elements respectively at various radial distances from the hub, and to transversely divide the radial space between the propelling elements, adjacent intersecting portions of said radial propelling elements and said transverse propelling members having substantially equal pitch with respect to the center of rotation of the wheel.

2. A propeller and impeller wheel comprising a hub, a plurality of blades extended substantially radially from the hub, each blade being twisted about its axis the outer edges of each blade being so curved as to substantially coincide with the arc of the outer periphery of the propeller, and connecting members in the spaces between the adjacent blades, said connecting members being inclined with respect to the center of rotation of the wheel at substantially the same angle of pitch as that of the pitch of the twisted blades.

3. A propeller and impeller wheel comprising a hub, a plurality of substantially radial blades, and a plurality of substantially transverse vanes extending across the spaces between said blades, said blades and vanes being so inclined with respect to the center of rotation of the wheel as to form a plurality of passages through the wheel bounded by inclined sides of substantially equal pitch.

4. A propeller and impeller wheel comprising, a hub, a plurality of substantially radial blades extended from the hub, and a plurality of transverse spiral vanes, each vane being extended respectively from the outer end of a different blade across the radial spaces between the blades and spirally toward the hub so as to intersect a plurality of blades progressively nearer to the hub forming substantially identical series of transverse partitions in said radial spaces.

5. A propeller and impeller wheel comprising, a hub, a plurality of substantially radial blades extended from the hub, each blade being twisted about its axis and a plurality of transverse spiral vanes extended from spaced points of the propeller periphery at substantially equal spiral toward the center so as to extend within and across the respective spaces in substantially identical series between the respective blades.

6. A propeller and impeller wheel comprising, a hub, a plurality of substantially radial blades extended from the hub, each blade being twisted about its axis and a plurality of transverse spiral vanes extended from spaced points of the propeller periphery toward the center so as to traverse the respective spaces between the blades, said vanes being so inclined transversely that the pitch of each vane at each area of intersection with a blade is substantially equal to the pitch of the twisted blade at said area of intersection.

7. In a propeller and impeller wheel of the character described a plurality of radial blades, and a plurality of spiral vanes each vane extending from the outer portion of one of the respective blades within and across the spaces between the blades and spirally toward the center of wheel, said blades and vanes being integrally united to form a wheel with substantially parallel and identical spiral series of passages across the wheel between said blades.

8. In a propeller and impeller wheel of the character described a plurality of radial blades, and a plurality of spiral vanes extended from the outer portions of the respective blades within and across the spaces between the blades and at equal spiral angles toward the center of wheel, said blades and vanes being integrally united to form a wheel with substantially parallel and identical spiral series of passages across the wheel, said vanes being inclined so as to converge toward the axis of the wheel.

9. In a propeller and impeller wheel of the character described a plurality of radial blades, and a plurality of spiral vanes each vane extending from the outer portion of one of the respective blades within and across the spaces between the blades and toward the center of wheel at equal spiral angles, said blades and vanes being integrally united to form a wheel with substantially parallel and identical spiral series of passages across the wheel, said vanes being inclined so as to converge toward the axis of the wheel, each of said blades being transversely and helically twisted about its axis.

10. A propeller and impeller wheel, comprising a hub, a plurality of substantially radial propelling elements extended from the hub, and a plurality of transverse propelling members formed across the radial spaces between said radial elements, each transverse propelling member spiralling from the outer portion of a different radial propelling element and toward the hub and intersecting the other radial propelling elements progressively nearer to the hub, the radial spacing between the series of intersections of the transverse spiral members on each radial propelling element being substantially the same, and said members dividing the radial space between the respective adjacent faces of said propelling elements into substantially identical series of transverse passages.

LIN E. BAKER.